United States Patent

Wu et al.

(10) Patent No.: US 9,378,130 B2
(45) Date of Patent: Jun. 28, 2016

(54) DATA WRITING METHOD, AND MEMORY CONTROLLER AND MEMORY STORAGE APPARATUS USING THE SAME

(75) Inventors: Chung-Lin Wu, Taichung (TW); Yi-Hsiang Huang, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 635 days.

(21) Appl. No.: 13/366,271

(22) Filed: Feb. 4, 2012

(65) Prior Publication Data

US 2013/0132640 A1 May 23, 2013

(30) Foreign Application Priority Data

Nov. 18, 2011 (TW) .............................. 100142248 A

(51) Int. Cl.
*G06F 12/00* (2006.01)
*G06F 12/02* (2006.01)

(52) U.S. Cl.
CPC .... *G06F 12/0246* (2013.01); *G06F 2212/7203* (2013.01); *G06F 2212/7205* (2013.01)

(58) Field of Classification Search
None
See application file for complete search history.

(56) References Cited

U.S. PATENT DOCUMENTS

| 2009/0172256 | A1* | 7/2009 | Chu et al. ....................... 711/103 |
| 2011/0087827 | A1* | 4/2011 | Yeh ................................. 711/103 |
| 2011/0252187 | A1* | 10/2011 | Segal et al. ..................... 711/103 |

FOREIGN PATENT DOCUMENTS

| TW | 201120896 | 6/2011 |
| TW | 201133236 | 10/2011 |

OTHER PUBLICATIONS

"Office Action of Taiwan Counterpart Application", issued on Apr. 3, 2014, p. 1-p. 9.

* cited by examiner

*Primary Examiner* — Daniel Tsui
(74) *Attorney, Agent, or Firm* — Jianq Chyun IP Office

(57) ABSTRACT

A data writing method for a rewritable non-volatile memory module, and a memory controller and a memory storage apparatus using the same are provided. The method includes partitioning physical blocks of the rewritable non-volatile memory module into a data area and a spare area and configuring logical blocks. The method also includes selecting physical blocks from the spare area as spare physical blocks corresponding to a logical block and using only lower physical pages of the spare physical blocks to store updated data that is to be written into the logical block. The method further includes moving valid data of all logical pages of the logical block into a physical block of the data area, wherein each lower physical page and an upper physical page corresponding thereto in the physical block are programmed together. Accordingly, the method can effectively improve the speed and reliability of writing data.

21 Claims, 9 Drawing Sheets

| Lower physical page address | Middle physical page address | Upper physical page address |
|---|---|---|
| 0 | 1 | 2 |
| 3 | 4 | 5 |
| 6 | 7 | 8 |
| 9 | 10 | 11 |
| 12 | 13 | 14 |
| ⋮ | ⋮ | ⋮ |
| 255 | 256 | 257 |

DATA WRITING METHOD, AND MEMORY CONTROLLER AND MEMORY STORAGE APPARATUS USING THE SAME

CROSS-REFERENCE TO RELATED APPLICATION

This application claims the priority benefit of Taiwan application serial no. 100142248, filed on Nov. 18, 2011. The entirety of the above-mentioned patent application is hereby incorporated by reference herein and made a part of this specification.

BACKGROUND

1. Technology Field

The present invention relates to a data writing method. More particularly, the present invention relates to a data writing method for a rewritable non-volatile memory module, a memory controller using the data writing method, and a memory storage apparatus using the data writing method.

2. Description of Related Art

Along with the widespread of digital cameras, cell phones, and MP3 in recently years, the consumers' demand to storage media has increased drastically. Since a rewritable non-volatile memory has the characteristics of non-volatility of data, low power consumption, small volume, non-mechanical structure, and fast reading and writing speed, the rewritable non-volatile memory is the most adaptable memory to be applied in a portable electronic product, e.g., a notebook computer. A solid state drive (SSD) is a storage apparatus which utilizes a flash memory as its storage medium. Therefore, the flash memory industry has become a very popular part of the electronic industry in recent years.

An NAND flash memory may be classified into a Single Level Cell (SLC) NAND flash memory, a Multi Level Cell (MLC) NAND flash memory, or a Trinary Level Cell (TLC) NAND flash memory according to the number of bits which each memory cell thereof is capable of storing. Specifically, each memory cell in the SLC NAND flash memory can store one bit of data (i.e., "1" or "0"), each memory cell in the MLC NAND flash memory can store two bits of data, and each memory cell in the TLC NAND flash memory can store three bits of data.

In the NAND flash memory, a physical page is composed of several memory cells arranged on the same word line. Since each memory cell in the SLC NAND flash memory can store one bit of data, several memory cells arranged on the same word line in the SLC NAND flash memory correspond to one physical page.

By contrast, a floating gate storage layer in each memory cell of the MLC NAND flash memory can store two bits of data, and a storage state (i.e., "11," "10," "01," or "00") thereof includes the least significant bit (LSB) and the most significant bit (MSB). For instance, the first bit from the left of the storage states is the LSB, and the second bit from the left of the storage states is the MSB. Accordingly, several memory cells arranged on the same word line may constitute two physical pages, wherein the physical pages constituted by the LSB and the MSB of the memory cells are lower physical pages and upper physical pages, respectively. The speed of writing data into the lower physical page is faster than writing data into the upper physical page, and when a program fail occurs in the process of programming the upper physical page, the data stored in the lower physical page corresponding to the programmed upper physical page may be lost.

Similarly, each memory cell in the TLC NAND flash memory can store three bits of data, and storage state (i.e., "111," "110," "101," "100," "011," "010," "001," or "000") thereof includes the first bit (i.e., the LSB), the second bit (i.e., the center significant bit, CSB), and the third bit (i.e., the MSB) from the left of the storage states. Accordingly, several memory cells arranged on the same word line may constitute three physical pages, wherein the physical pages constituted by the LSB, the CSB, and the MSB of the memory cells are lower physical pages, middle physical pages, and upper physical pages, respectively. In particular, while several memory cells on the same word lines are programmed, only the lower physical page can be programmed, or all of the lower, the middle, and the upper physical pages need be simultaneously programmed; otherwise, the stored data may be lost.

Therefore, how to enhance the reliability and performance of the flash memory to enable each memory cell therein to store multiple bits of data is one of the major subjects to which people skilled in the art are dedicated.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a data writing method, a memory controller, and a memory storage apparatus capable of improving data access efficiency and reliability.

According to an exemplary embodiment of the present invention, a data writing method for a rewritable non-volatile memory module having a plurality of physical blocks is provided, wherein each of the physical blocks has a plurality of physical page sets sequentially arranged, each of the physical page sets has a lower physical page and an upper physical page, and the speed of writing data into the lower physical pages is faster than the speed of writing data into the upper physical pages. The data writing method includes partitioning the physical blocks into at least a data area and a spare area and configuring a plurality of logical blocks according to the physical blocks belonging to the data area, wherein each of the logical blocks has a plurality of logical pages. The data writing method further includes receiving updated data, wherein the updated data is to be written into a first logical block among the logical blocks. The data writing method further includes selecting a plurality of physical blocks as spare physical blocks of a spare physical block set corresponding to the first logical block from the spare area; writing the updated data only into the lower physical pages of the spare physical blocks of the spare physical block set; moving valid data of all the logical pages of the first logical block from the spare physical blocks of the spare physical block set to a first physical block among the physical blocks of the data area, wherein the valid data of all the logical pages of the first logical block is sequentially written into the lower physical page and the upper physical page of each of the physical page sets of the first physical block, and the lower physical page and the upper physical page of each of the physical page sets of the first physical block are programmed together.

According to an exemplary embodiment of the present invention, a memory controller for controlling a rewritable non-volatile memory module having a plurality of physical blocks is provided, each of the physical blocks has a plurality of physical page sets sequentially arranged, each of the physical page sets has a lower physical page and an upper physical page, and the speed of writing data into the lower physical pages is faster than the speed of writing data into the upper physical pages. The memory controller includes a host interface, a memory interface, and a memory management circuit. The host interface is configured for coupling to a host system. The memory interface is configured for coupling to the rewritable non-volatile memory module. The memory management circuit is coupled to the host interface and the memory interface and configured to at least partition the physical blocks into a data area and a spare area. The memory management circuit is further configured to configure a plurality of logical blocks according to the physical blocks of the data area, and each of the logical blocks has a plurality of logical pages. The memory management circuit is further configured to receive updated data from the host system, and the updated data is to be written into a first logical block among the logical blocks. The memory management circuit is further configured to select a plurality of physical blocks as spare physical blocks of a spare physical block set corresponding to the first logical block from the spare area and write the updated data only into the lower physical pages of the spare physical blocks of the spare physical block set. The memory management circuit is further configured to move valid data of all the logical pages of the first logical block from the spare physical blocks of the spare physical block set to a first physical block among the physical blocks of the data area, wherein the valid data of all the logical pages of the first logical block are sequentially written into the lower physical page and the upper physical page of each of the physical page sets of the first physical block, and the lower physical page and the upper physical page of each of the physical page sets of the first physical block are programmed together.

According to an exemplary embodiment of the present invention, a memory storage apparatus including a connector, a rewritable non-volatile memory module, and a memory controller is provided. The connector is configured for coupling to a host system. The rewritable non-volatile memory module has a plurality of physical blocks, each of which has a plurality of physical page sets sequentially arranged. Each of the physical page sets has a lower physical page and an upper physical page, and the speed of writing data into the lower physical pages is faster than the speed of writing data into the upper physical pages. The memory controller is coupled to the connector and the rewritable non-volatile memory module and configured to at least partition the physical blocks into a data area and a spare area. The memory controller is also configured to configure a plurality of logical blocks according to the physical blocks of the data area, and each of the logical blocks has a plurality of logical pages. The memory controller is further configured to receive updated data from the host system, and the updated data is to be written into a first logical block among the logical blocks. The memory controller is further configured to select a plurality of physical blocks as spare physical blocks of a spare physical block set corresponding to the first logical block from the spare area and write the updated data only into the lower physical pages of the spare physical blocks of the spare physical block set. The memory controller is further configured to move valid data of all the logical pages of the first logical block from the spare physical blocks of the spare physical block set to a first physical block among the physical blocks of the data area, wherein the valid data of all the logical pages of the first logical block are sequentially written into the lower physical page and the upper physical page of each of the physical page sets of the first physical block, and the lower physical page and the upper physical page of each of the physical page sets of the first physical block are programmed together.

Based on the above, the data reading method, the memory controller and the memory storage apparatus described in the exemplary embodiments of the present invention are capable of effectively improving reliability and speed of data storage.

It should be understood, however, that this Summary may not contain all of the aspects and embodiments of the present invention, is not meant to be limiting or restrictive in any manner, and that the present invention as disclosed herein is and will be understood by those of ordinary skill in the art to encompass obvious improvements and modifications thereto.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF THE EMBODIMENTS

Figure 1A:
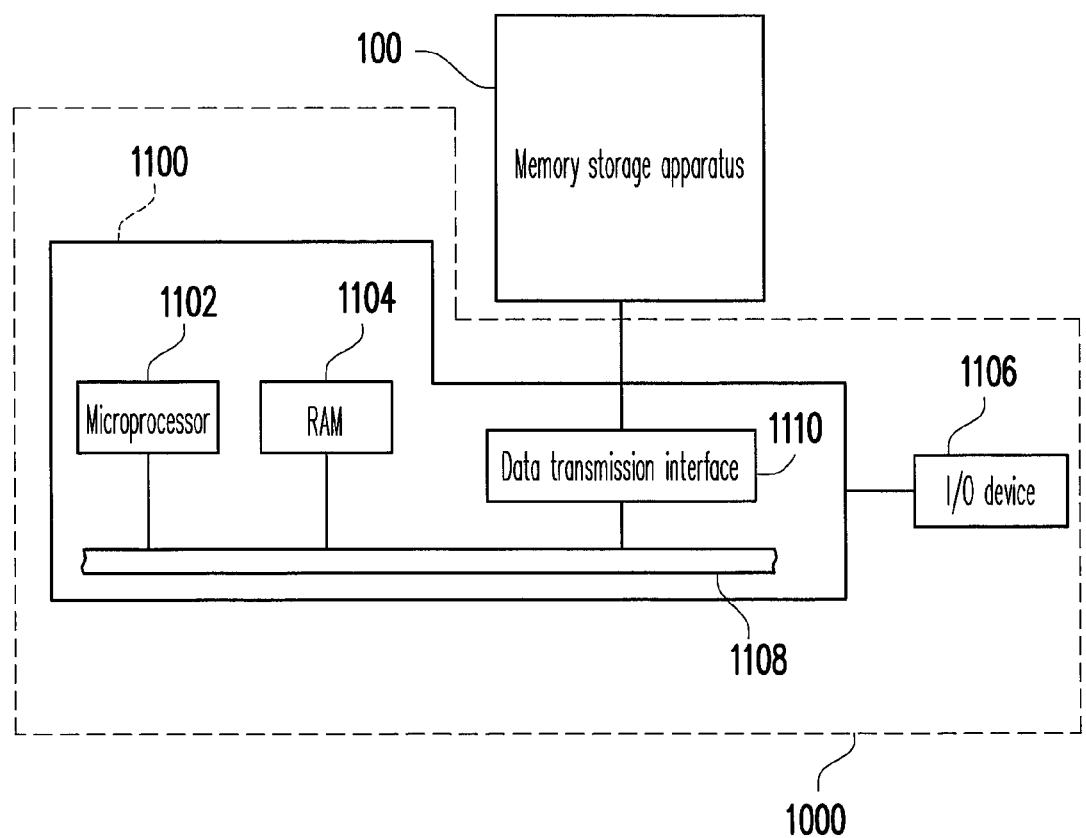
FIG. 1A illustrates a host system and a memory storage apparatus according to an exemplary embodiment of the present invention.

Reference will now be made in detail to the present preferred embodiments of the present invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B or C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

A memory storage apparatus (i.e., a memory storage system) typically includes a flash memory module and a controller (i.e., a control circuit). The memory storage apparatus is usually used together with a host system, such that the host system can write data into or read data from the memory storage apparatus.

FIG. 1A illustrates a host system and a memory storage apparatus according to an exemplary embodiment of the present invention.

Figure 1B:
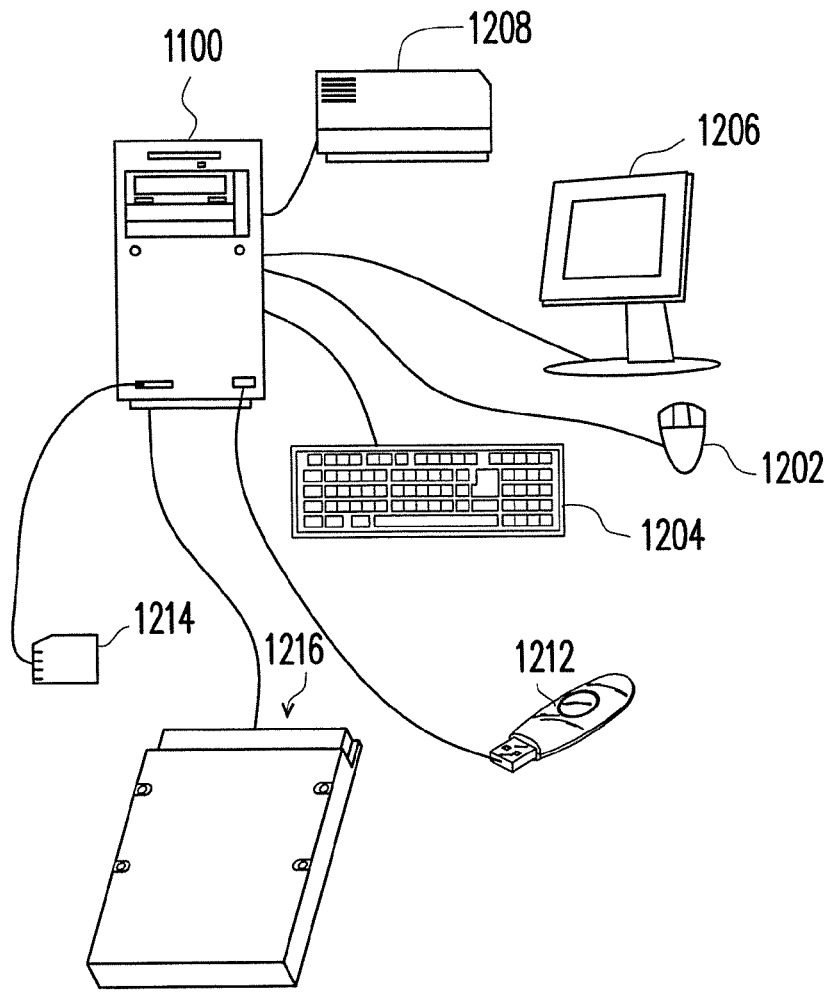
FIG. 1B schematically illustrates a computer, an input/output (I/O) device, and a memory storage apparatus according to an exemplary embodiment of the present invention.

With reference to FIG. 1A, a host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208 as shown in FIG. 1B. It should be understood that the I/O device 1106 is not limited to the devices illustrated in FIG. 1B and may further include other devices.

In the exemplary embodiment, the memory storage apparatus 100 is coupled to other devices of the host system 1000 through the data transmission interface 1110. By using the microprocessor 1102, the RAM 1104, and the I/O device 1106, the data can be written into or read from the memory storage apparatus 100. For instance, the memory storage apparatus 100 may be a rewritable non-volatile memory storage apparatus, such as a flash drive 1212, a memory card 1214, or a solid state drive (SSD) 1216 as shown in FIG. 1B.

Figure 1C:
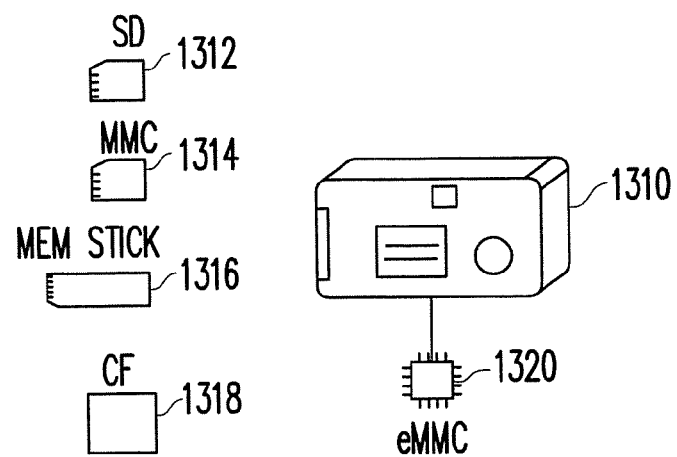
FIG. 1C schematically illustrates a host system and a memory storage apparatus according to another exemplary embodiment of the present invention.

Generally, the host system 1000 can substantially be any system used together with the memory storage apparatus 100 for storing data. Even though the host system 1000 is described as a computer system in the present exemplary embodiment, the host system 1000 in another exemplary embodiment may be a digital camera, a video camera, a communication device, an audio player, a video player, and so forth. For instance, if the host system is a digital camera (video camera) 1310, the rewritable non-volatile memory storage apparatus is an SD card 1312, an MMC 1314, a memory stick 1316, a CF card 1318, or an embedded storage apparatus 1320 (as shown in FIG. 1C). The embedded storage device 1320 includes an embedded MMC (eMMC). It should be mentioned that the eMMC is directly coupled to the substrate of the host system.

Figure 2:
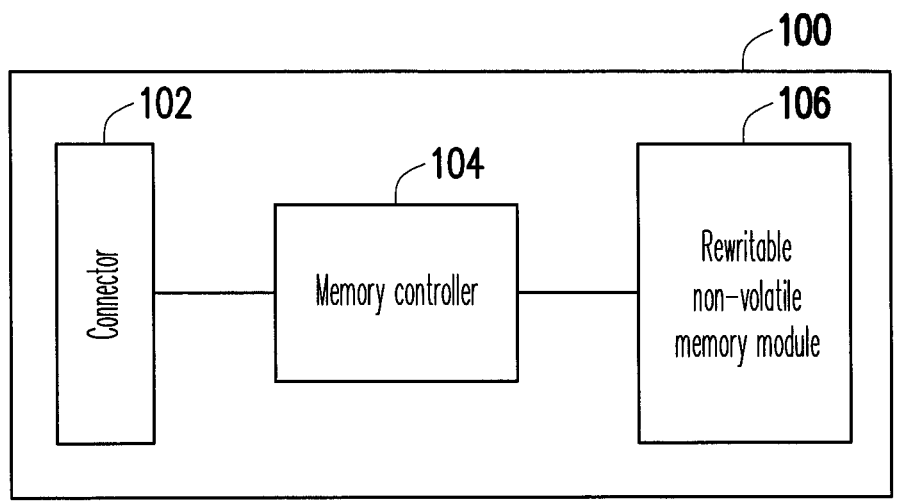
FIG. 2 is a schematic block diagram illustrating the memory storage apparatus depicted in FIG. 1A.

FIG. 2 is a schematic block diagram illustrating the memory storage apparatus depicted in FIG. 1A.

With reference to FIG. 2, the memory storage apparatus 100 includes a connector 102, a memory controller 104, and a rewritable non-volatile memory module 106.

In the present exemplary embodiment, the connector 102 complies with the serial advanced technology attachment (SATA) standard. However, the present invention is not limited thereto, and the connector 102 may also comply with the Institute of Electrical and Electronic Engineers (IEEE) 1394 standard, the parallel advanced technology attachment (PATA) standard, the peripheral component interconnect (PCI) express standard, the universal serial bus (USB) standard, the secure digital (SD) standard, the memory sick (MS) standard, the multi media card (MMC) standard, the compact flash (CF) standard, the integrated device electronics (IDE) standard, or other suitable standards.

The memory controller 104 is configured for executing a plurality of logic gates or control instructions implemented in a form of hardware or firmware and performing various data operations in the rewritable non-volatile memory module 106 according to commands issued by the host system 1000, such as data writing, reading, erasing, merging, and so on.

The rewritable non-volatile memory module 106 is coupled to the memory controller 104 and equipped with a plurality of physical blocks for storing data written by the host system 1000.

In the present exemplary embodiment, each of the physical blocks has a plurality of physical page sets, and each of the physical page sets includes at least one physical page constituted by memory cells arranged on the same word line, wherein the physical pages belonging to the same physical block must be erased simultaneously. In detail, each of the physical blocks is the smallest unit for erasing data. Namely, each of the physical blocks contains the least number of memory cells that are erased all together.

Each physical page usually includes a data bit area and a redundant bit area. The data bit area is used for storing user data, and the redundant bit area is used for storing system data (e.g., error checking and correcting (ECC) codes). In this exemplary embodiment, each of the physical blocks is constituted by 258 physical pages, and a capacity of each of the physical pages is 8 kilobytes (KB). Nevertheless, it should be understood that the present invention is not limited thereto.

In the present exemplary embodiment, the rewritable non-volatile memory module 106 is a Trinary Level Cell (TLC) NAND flash memory module. However, the present invention is not limited thereto, and in another exemplary embodiment the rewritable non-volatile memory module 106 may be another memory module having the same characteristics.

Figure 3A:
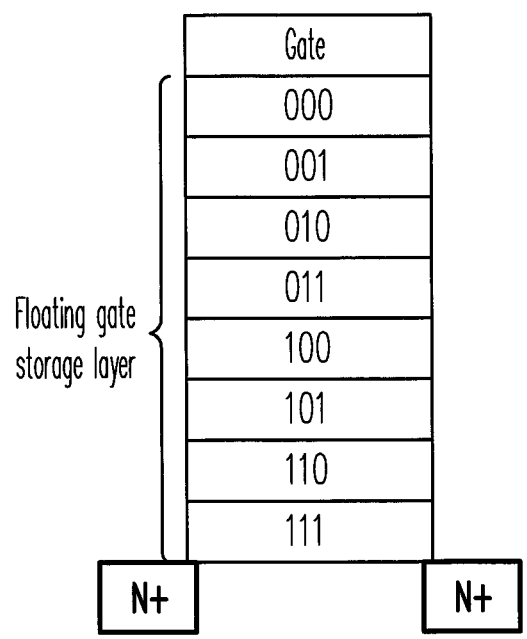
FIG. 3A and FIG. 3B are schematic diagrams illustrating a memory cell storage structure and a physical block according to an exemplary embodiment of the present invention.
Figures 3B, 4:
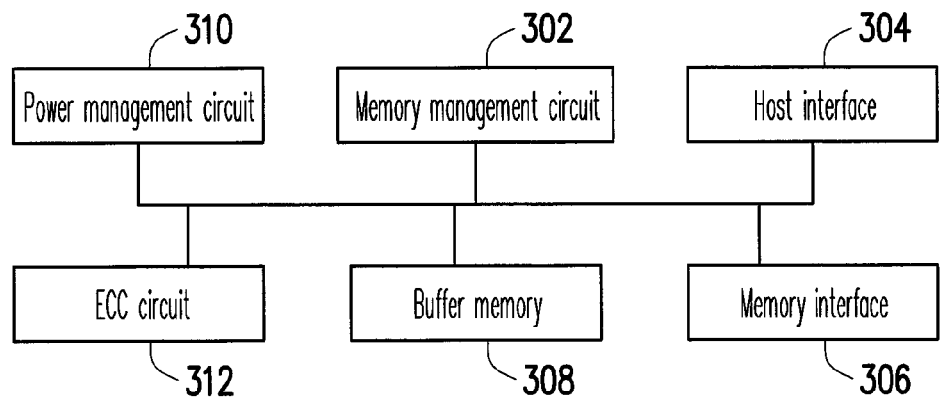
FIG. 4 is a schematic block diagram illustrating a memory controller according to an exemplary embodiment of the present invention.

FIG. 3A and FIG. 3B are schematic diagrams illustrating a memory cell storage structure and a physical block according to an exemplary embodiment of the present invention.

With reference to FIG. 3A, each storage state (i.e., "111," "110," "101," "100," "011," "010," "001," or "000") of each memory cell in the rewritable non-volatile memory module 106 can be identified (as shown in FIG. 3A), wherein the first bit from the left of the storage states is the LSB, the second bit from the left of the storage states is the CSB, and the third bit from the left of the storage states is the MSB. Besides, several memory cells arranged on the same word line may constitute three physical pages, wherein the physical pages constituted by the LSB, the CSB, and the MSB of the memory cells are lower physical pages, middle physical pages, and upper physical pages, respectively.

As shown in FIG. 3B, one physical block is composed of a plurality of physical page sets, each of which includes a lower physical page, a middle physical page, and an upper physical page that are constituted by several memory cells arranged on the same word line. For instance, in one physical block, the $0^{th}$ physical page belonging to the lower physical page, the $1^{st}$ physical page belonging to the middle physical page, and the $2^{nd}$ physical page belonging to the upper physical page are deemed a physical page set. Similarly, the $3^{rd}$, $4^{th}$ and $5^{th}$ physical pages are considered one physical page set, and so are other physical pages.

FIG. 4 is a schematic block diagram illustrating a memory controller according to an exemplary embodiment of the present invention. It should be understood that the memory controller depicted in FIG. 4 is merely exemplary and should not be construed as a limitation to the present invention.

With reference to FIG. 4, the memory controller 104 includes a memory management circuit 302, a host interface 304, a memory interface 306, a buffer memory 308, a power management circuit 310, and an error checking and correcting (ECC) circuit 312.

The memory management circuit 302 is configured for controlling the overall operation of the memory controller 104. Particularly, the memory management circuit 302 has a plurality of control instructions; when the memory storage apparatus 100 is operated, the control instructions are executed to perform a data writing operation, a data reading operation, a data erasing operation, and so on.

In the present exemplary embodiment, the control instructions of the memory management circuit 302 are implemented in a firmware form. For instance, the memory management circuit 302 has a microprocessor unit (not shown) and a read-only memory (ROM, not shown), and the control instructions are burnt into the ROM. When the memory storage apparatus 100 is operated, the control instructions are executed by a microprocessor unit to write, read, and erase data.

In another exemplary embodiment, the control instructions of the memory management circuit 302 are stored in a specific area (for instance, the system area of the memory module exclusively used for storing system data) of the rewritable non-volatile memory module 106 as program codes. Additionally, the memory management circuit 302 may have a micro-processor unit (not shown), a read-only memory (not shown) and a random access memory (not shown). In particular, the ROM has a boot code, and when the memory controller 104 is enabled, the microprocessor unit first executes the boot code to load the control instructions from the rewritable non-volatile memory module 106 into the RAM of the memory management circuit 302. The microprocessor unit then executes the control instructions to write, read, and erase data.

Additionally, the control instructions of the memory management circuit 302 may also be implemented in a hardware form according to another exemplary embodiment. For instance, the memory management circuit 302 includes a microcontroller, a memory management unit, a memory writing unit, a memory reading unit, a memory erasing unit, and a data processing unit. The memory management unit, the memory writing unit, the memory reading unit, the memory erasing unit, and the data processing unit are coupled to the microcontroller. The memory management unit is configured for managing the physical blocks of the rewritable non-volatile memory module 106; the memory writing unit is configured for issuing a write command to the rewritable non-volatile memory module 106, so as to write data into the rewritable non-volatile memory module 106; the memory reading unit is configured for issuing a read command to the rewritable non-volatile memory module 106, so as to read data from the rewritable non-volatile memory module 106; the memory erasing unit is configured for issuing an erase command to the rewritable non-volatile memory module 106, so as to erase data from the rewritable non-volatile memory module 106; the data processing unit is configured for processing both the data to be written into the rewritable non-volatile memory module 106 and the data to be read from the rewritable non-volatile memory module 106.

The host interface 304 is coupled to the memory management circuit 302 and configured for receiving and identifying commands and data transmitted by the host system 1000. In the present exemplary embodiment, the host interface 304 complies with the SATA standard. However, the present invention is not limited thereto, and the host interface 304 may also comply with the PATA standard, the IEEE 1394 standard, the PCI Express standard, the USB standard, the SD standard, the MS standard, the MMC standard, the CF standard, the IDE standard, or any other appropriate data transmission standard.

The memory interface 306 is coupled to the memory management circuit 302 and configured to access the rewritable non-volatile memory module 106. Namely, data to be written into the rewritable non-volatile memory module 106 is converted by the memory interface 306 into a format acceptable to the rewritable non-volatile memory module 106.

The buffer memory 308 is coupled to the memory management circuit 302 and configured to temporarily store data and commands received from the host system 1000 or data received from the rewritable non-volatile memory module 106. For instance, the buffer memory 302 may be a static random access memory (SRAM), a dynamic random access memory (DRAM), and so forth.

The power management circuit 310 is coupled to the memory management circuit 302 and configured for controlling the power of the memory storage apparatus 100.

The ECC circuit 312 is coupled to the memory management circuit 302 and configured for executing an error correcting procedure to ensure data accuracy. Specifically, when the host interface 304 receives a write command from the host system 1000, the ECC circuit 212 generates an ECC code for data (i.e., the updated data) corresponding to the write command, and the memory management circuit 302 writes the updated data and the corresponding ECC code into the rewritable non-volatile memory module 106. Subsequently, when the memory management circuit 302 reads the data from the rewritable non-volatile memory module 106, the memory management circuit 302 simultaneously reads the ECC code corresponding to the read data, and the ECC circuit 312 executes the error correcting procedure for the read data based on the ECC code.

Figure 5:
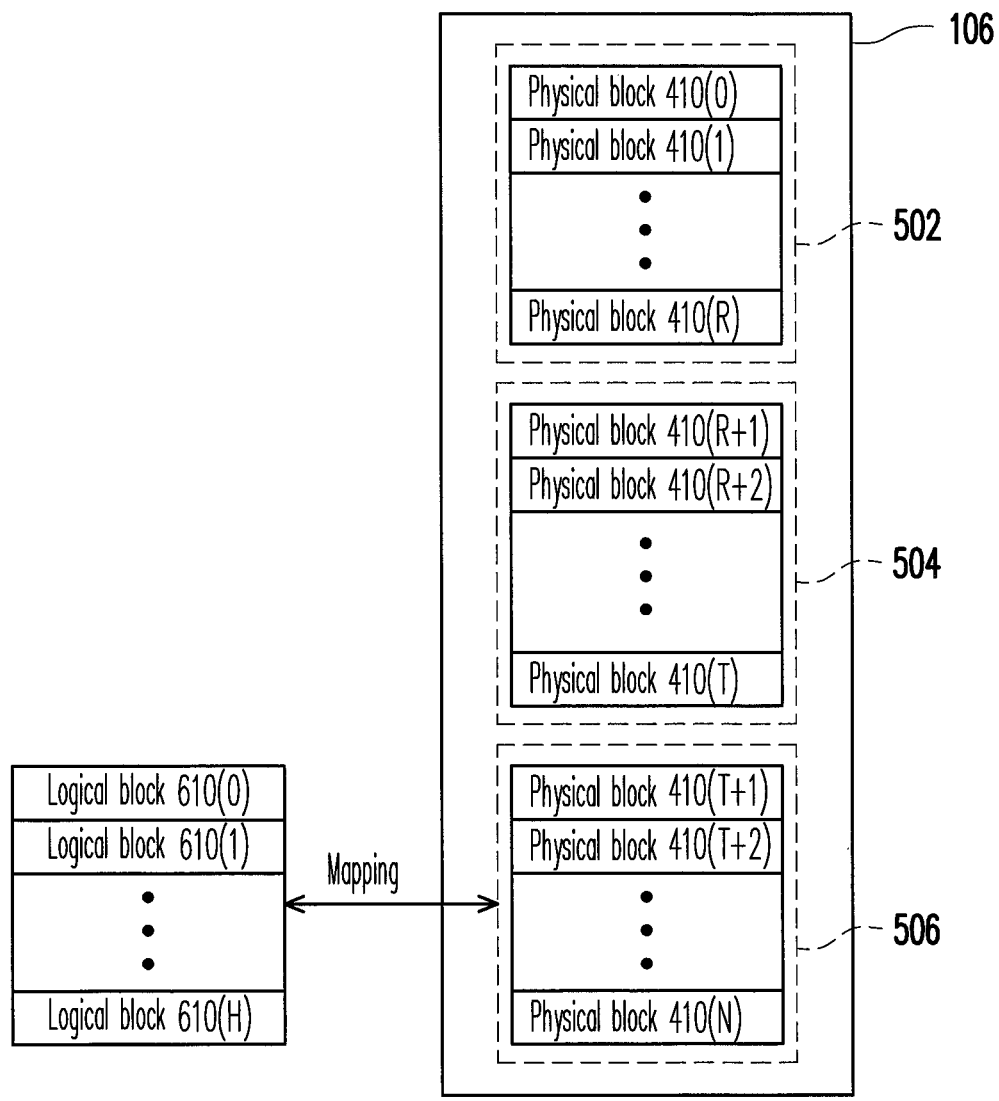
FIG. 5 is a schematic diagram illustrating management of physical blocks in a rewritable non-volatile memory module according to an exemplary embodiment of the present invention.

FIG. 5 is a schematic diagram illustrating management of physical blocks in a rewritable non-volatile memory module according to an exemplary embodiment of the present invention.

With reference to FIG. 4A, the rewritable non-volatile memory module 106 has physical blocks 410(0)~410(N), and the memory management circuit 302 of the memory controller 104 partitions the physical blocks 410(0)~410(N) into a replacement area 502, a spare area 504, and a data area 506.

Physical blocks belonging to the replacement area 502 are used in a bad physical block replacement procedure for replacing damaged physical blocks. Particularly, if there are still normal physical blocks in the replacement area 502, and a physical block of the data area 506 or the spare area 504 is damaged, the memory management circuit 302 selects a normal physical block from the replacement area 502 to replace the damaged physical block.

Physical blocks of the spare area 504 are configured for temporarily storing data written by the host system 1000. The detailed data writing method is described hereinafter with reference to the drawings. It should be mentioned that in the present exemplary embodiment, the memory management circuit 302 manages the physical blocks of the spare area 504 in a single-page mode. To be more specific, in the single-page mode, data are merely stored in the lower physical pages. That is, the memory management circuit 302 only performs the data writing, reading, and erasing operations on the lower physical pages in the single-page mode.

Physical blocks of the data area 506 are configured for storing data written by the host system 1000. Particularly, the memory management circuit 302 converts logical access addresses accessed by the host system 1000 into corresponding logical pages of logical blocks and maps the logical pages of the logical blocks to the physical pages of the physical blocks belonging to the data area 506. Namely, the physical blocks of the data area 506 are deemed used physical blocks (e.g., the physical blocks already contain data written by the host system 1000). Additionally, the memory management circuit 302 records the mapping relationship between the logical blocks and the physical blocks of the data area 506 in a logical block-physical block mapping table, wherein the logical pages of each logical block are sequentially mapped to the physical pages of the corresponding physical block. For instance, in the present exemplary embodiment, the logical blocks 610(0)~610(H) are configured to map the physical blocks of the data area 506, the capacity of one logical block is equal to the capacity of one physical block, and the number of physical blocks of the data area 506 must be greater than or equal to the logical blocks of the data area 506. That is to say, the number of physical blocks of the data area 506 is closely related to the capacity of the memory storage apparatus 100. In this exemplary embodiment, the number of logical blocks 610(0)~610(H) equals the number of physical blocks of the data area 506.

In the present exemplary embodiment, the memory management circuit 302 manages the physical blocks of the data area 506 in a multi-page mode. Particularly, in the multi-page mode, data are stored in the lower, the middle, and the upper physical pages, and the physical pages of the same physical page set are all programmed when the data are written into the physical blocks of the data area 506. That is, the memory management circuit 302 programs the lower, middle, and upper physical pages of one physical page set when data are written in the multi-page mode. It should be mentioned that in an exemplary embodiment the physical pages of one physical page set are simultaneously or stepwise programmed when the physical blocks of the data area 506 are operated in the multi-page mode. Compared to the physical blocks operated in the single-page mode, the physical blocks operated in the multi-page mode have shorter service lives. Specifically, the number of times of writing data into or erasing data from each physical block is limited; therefore, when the number of times of writing data into a certain physical block exceeds a threshold value, the physical block will be damaged, and data can no longer be written thereinto. Here, the threshold value of the physical blocks operated in the multi-page mode is lower than the threshold value of the physical blocks operated in the single-page mode.

In view of the above, the physical blocks of the spare area 504 and the data area 506 are operated in different mode; accordingly, once a physical block is partitioned into the spare area 504 or the data area 506, the physical block can merely be used in the partitioned area. Namely, the memory management circuit 302 independently operates the physical blocks of the data area 506 and the physical blocks of the spare area 504 rather than collectively operates these physical blocks of different areas. For instance, once a physical block is partitioned into the spare area 504, the memory management circuit 302 operates the physical block of the spare area 504 in the single-page mode until the physical block is damaged; alternatively, once a physical block is partitioned into the data area 506, the memory management circuit 302 operates the physical block of the data area 506 in the multi-page mode until the physical block no longer belongs to the data area 506.

Figure 6:
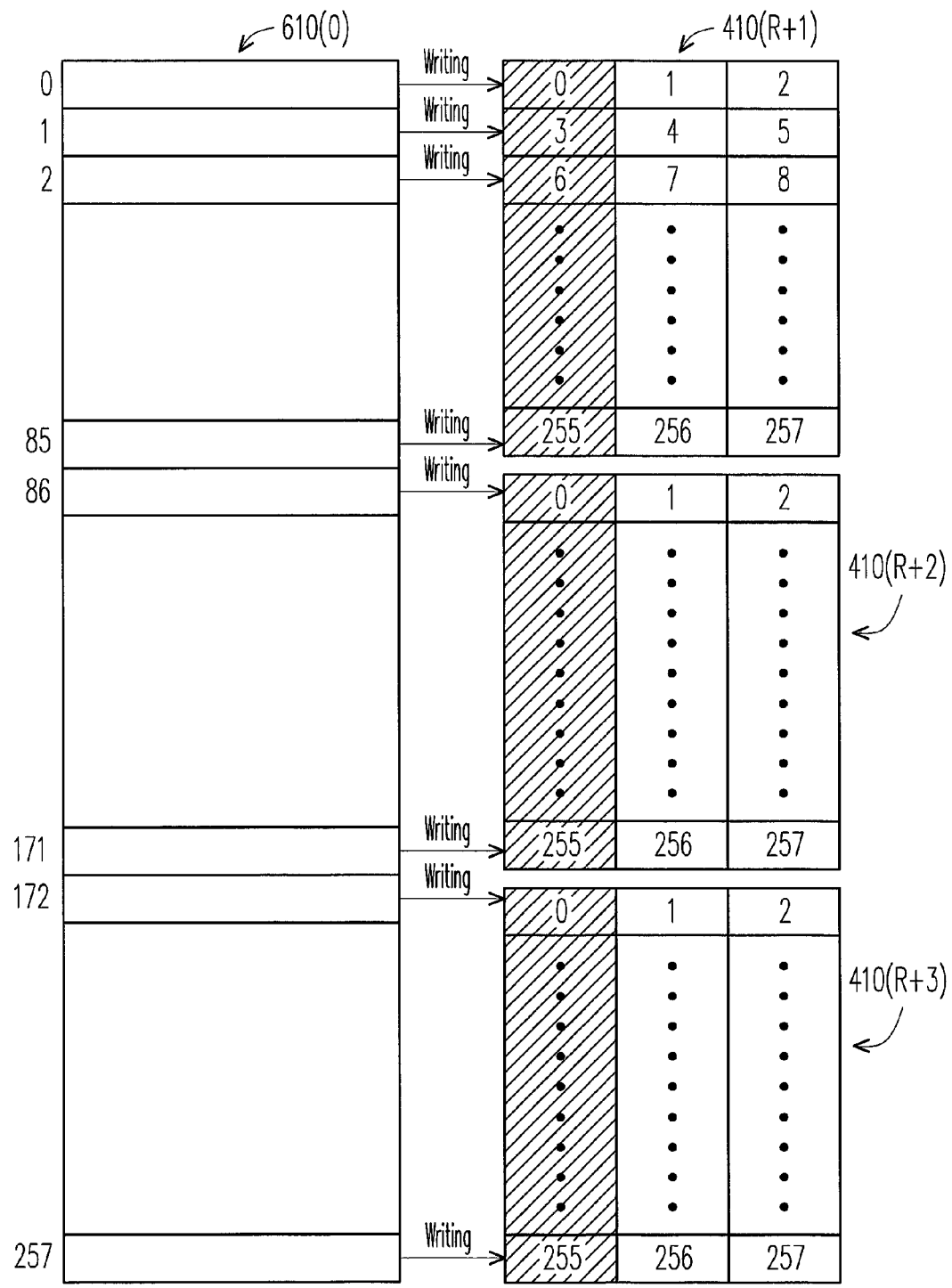
FIG. 6 is a schematic diagram illustrating an example of writing data.

FIG. 6 is a schematic diagram illustrating an example of writing data.

With reference to FIG. 6, when the memory storage apparatus 100 receives a write command from the host system 1000 for storing updated data into the $0^{th}$~$257^{th}$ logical pages belonging to the logical block 610(0), the memory management circuit 302 selects the physical blocks 410(R+1)~410(R+3) from the spare area 504 as the first spare physical block to the third spare physical block of the spare physical block set corresponding to the logical block 610(0) and writes the updated data into the $0^{th}$~$257^{th}$ logical pages belonging to the logical block 610(0). Because the physical blocks of the spare area 504 can only be programmed in the single-page mode, it requires the capacity of three spare physical blocks to store data of all logical pages belonging to one logical block.

After that, in an exemplary embodiment, the memory management circuit 302 sequentially writes the updated data to be stored into the $0^{th}$~$85^{th}$ logical pages belonging to the logical block 610(0) (i.e., the first portion of data) into the lower physical pages of the first spare physical block 410(R+1), sequentially writes the updated data to be stored into the $86^{th}$~$171^{st}$ logical pages belonging to the logical block 610(0) (i.e., the second portion of data) into the lower physical pages of the second spare physical block 410(R+2), and sequentially writes the updated data to be stored into the $172^{nd}$~$257^{th}$ logical pages belonging to the logical block 610(0) (i.e., the third portion of data) into the lower physical pages of the third spare physical block 410(R+3). It should be noted that when a great amount of data is continuously written into the lower physical pages, the data writing operation can be effectively accelerated by applying a cache programming command to write data into the first, second, and third spare physical blocks in order. In another exemplary embodiment, the memory management circuit 302 re-organizes or arranges the updated data to be written into each logical page of the logical block 610(0) and simultaneously writes the re-organized or arranged data into the lower physical pages of the first, second, and third spare physical blocks 410(R+1)~410(R+3).

In the present exemplary embodiment, when the data to be stored by the host system 1000 is written into the spare area 504, the memory management circuit 302 transmits a response message indicating the completion of the data writing operation to the host system 1000. Thereafter, if the memory storage apparatus 100 is in an idling state for a period of time (e.g., not receiving any instruction from the host system 1000 for 30 seconds), or if the number of blank physical blocks of the spare area 504 is less than the predetermined threshold value, the memory management circuit 302 moves the valid data belonging to the same logical block from the spare area 504 into the data area 506. The predetermined threshold value is set to be 3, for instance. Nevertheless, it should be understood that the present invention is not limited thereto, and the predetermined threshold value may be set with other appropriate value. Here, the operation of moving the valid data belonging to the same logical block of the spare area 504 into the data area 506 is referred to as the data merge operation.

Figure 7:
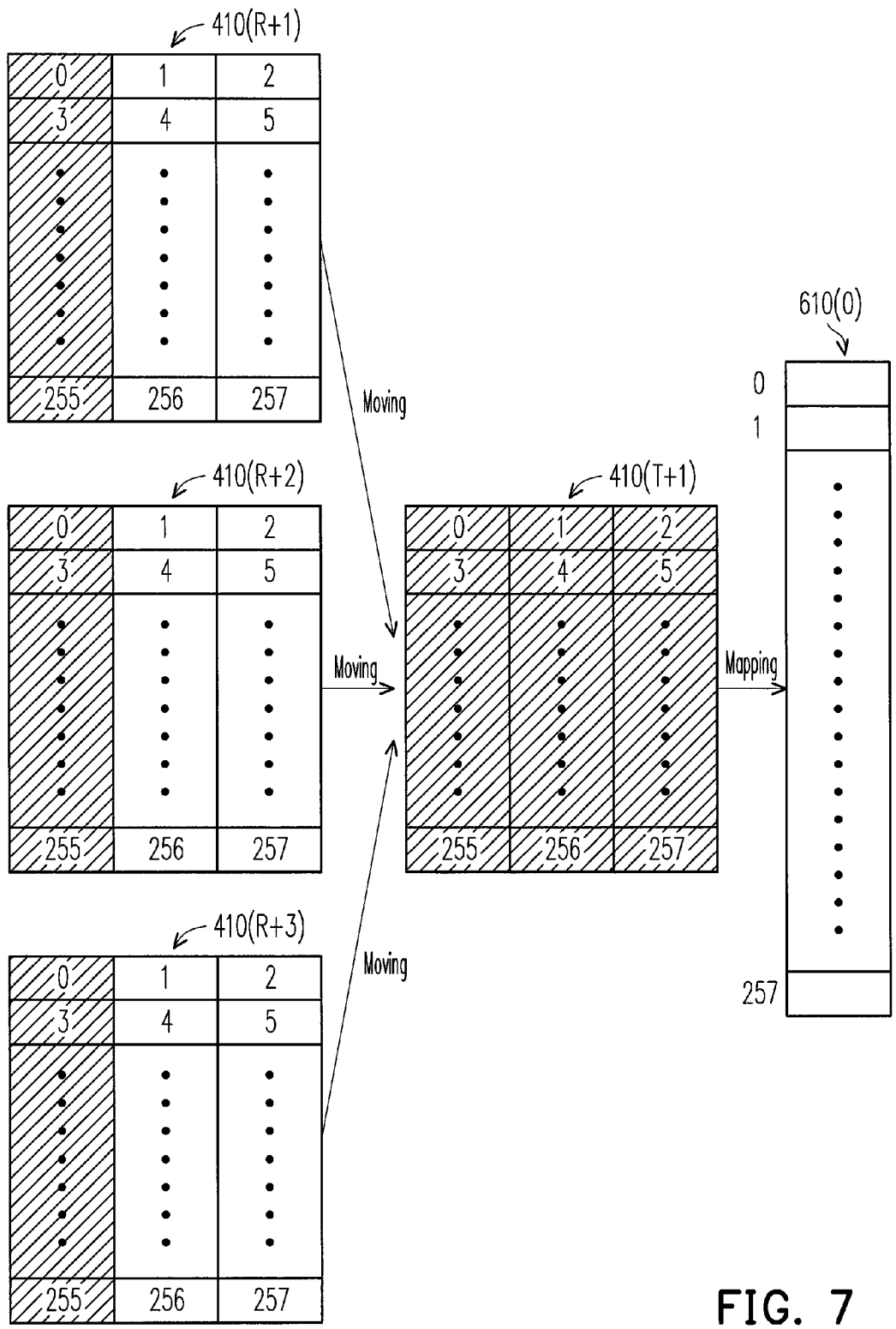
FIG. 7 is a schematic diagram illustrating an example of a data merge operation.

FIG. 7 is a schematic diagram illustrating an example of a data merge operation.

It is assumed that the spare physical blocks 410(R+1)~410(R+3) of the spare area 504 already store the valid data of all the logical pages of the logical block 610(0) (as shown in FIG. 6), and that the memory management circuit 302 determines to perform the data merge operation on the logical block 610(0).

With reference to FIG. 7, the memory management circuit 302 first selects a physical block 410(T+1) from the data area 504. Specifically, the memory management circuit 302 selects a blank physical block or a physical block storing invalid data from the data area 504. If the selected physical block stores invalid data, the memory management circuit 302 performs an erasing operation on the physical block, i.e., the invalid data stored in the selected physical block need be erased first.

The memory management circuit 302 then moves the valid data of the $0^{th}$~$85^{th}$ logical pages belonging to the logical block 610(0) from the lower physical pages of the first spare physical block 410(R+1) to the corresponding pages (e.g., the $0^{th}$~$85^{th}$ physical pages) of the physical block 410(T+1). Next, the memory management circuit 302 moves the valid data of the $86^{th}$~$171^{st}$ logical pages belonging to the logical block 610(0) from the lower physical pages of the second spare physical block 410(R+2) to the corresponding pages (e.g., the $86^{th}$~$171^{st}$ physical pages) of the physical block 410(T+1). The memory management circuit 302 then moves the valid data of the $172^{nd}$~$257^{th}$ logical pages belonging to the logical block 610(0) from the lower physical pages of the third spare physical block 410(R+3) to the corresponding pages (e.g., the $172^{nd}$~$257^{th}$ physical pages) of the physical block 410(T+1).

As mentioned above, the physical blocks of the data area 506 are operated in the multi-page mode; therefore, when data are written into the physical pages of the physical block 410(T+1), the physical pages are simultaneously or stepwise programmed in units of each physical page set. To be more specific, in an exemplary embodiment, the $0^{th}$, $1^{st}$, and $2^{nd}$ physical pages of the physical block 410(T+1) are simultaneously programmed, so as to write the data of the $0^{th}$, $1^{st}$, and $2^{nd}$ logical pages belonging to the logical block 610(0); and the $4^{th}$, and $5^{th}$ physical pages of the physical block 410(T+1) are simultaneously programmed, so as to write the data of the $3^{rd}$, $4^{th}$ and $5^{th}$ logical pages belonging to the logical block 610(0). Similarly, data of other logical pages are written into the physical block 410(T+1) in units of each physical page set.

At last, the memory management circuit 302 maps the logical block 610(0) to the physical block 410(T+1) in the logical block-physical block mapping table and performs the erasing operation on the spare physical blocks 410(R+1)~410(R+3). In other words, when the next write command is executed, the erased physical blocks 410(R+1)~410(R+3) may be re-selected as the spare physical for a logical block indicated by the next write command.

Figure 8:
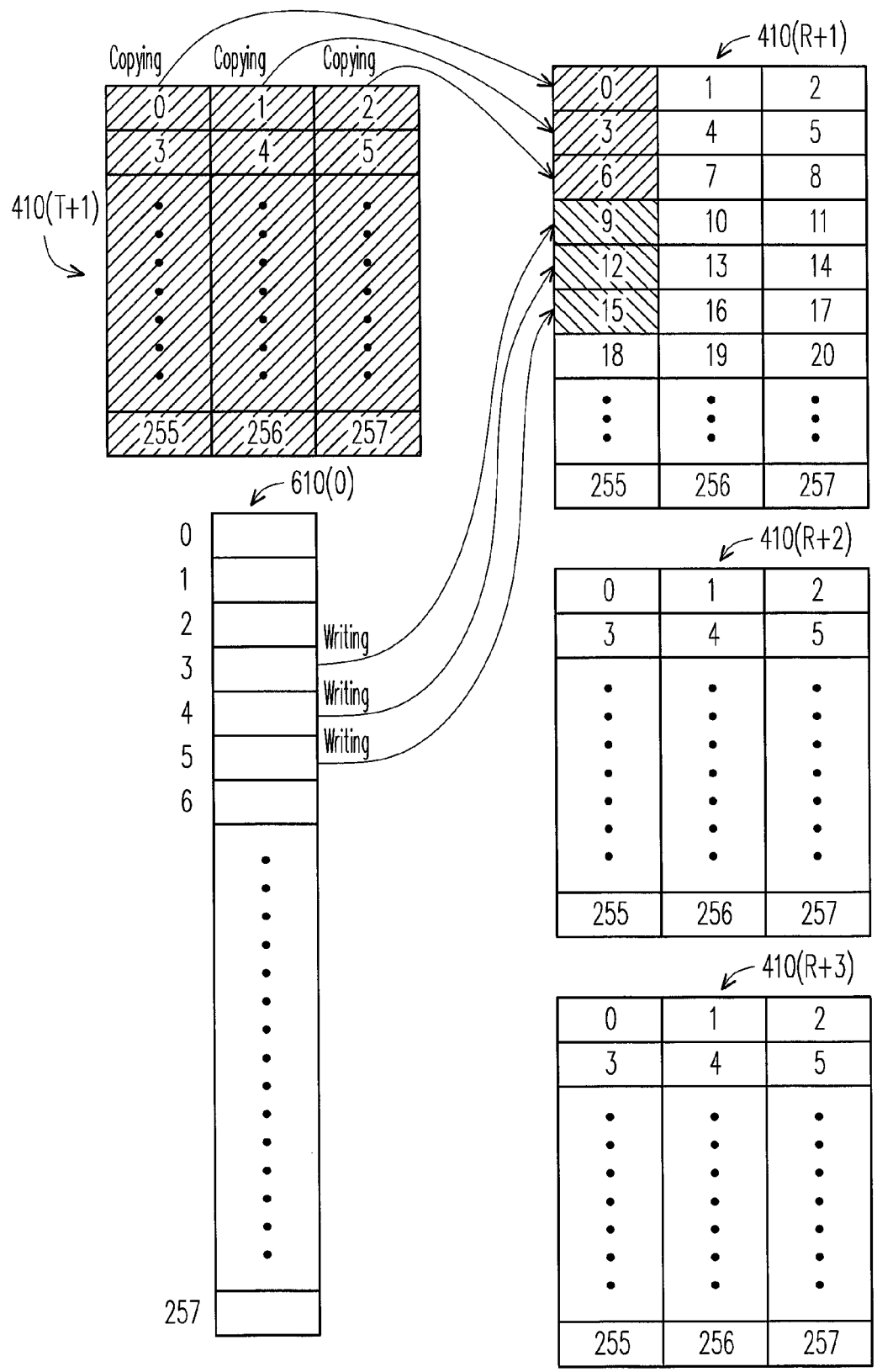
FIG. 8 is a schematic diagram illustrating another example of writing data.

FIG. 8 is a schematic diagram illustrating another example of writing data.

With reference to FIG. 8, if the physical block 410(T+1) of the data area 506 has already stored the data of all the logical pages of the logical block 610(0), and the host system 1000 is to update the data in the $3^{rd}$ to $5^{th}$ logical pages of the logical block 610(0), the memory management circuit 302 selects three physical blocks from the spare area 504 as the first, second, and third spare physical blocks (e.g., the physical blocks 410(R+1)~410(R+3)) corresponding to the logical block 610(0).

The memory management circuit 302 then sequentially copies the non-updated data (i.e., the data of the $0^{th}$~$2^{nd}$ logical pages belonging to the logical block 610(0), also referred to as the valid data) from the $0^{th}$~$2^{nd}$ physical pages of the physical block 410(T+1) to the lower physical pages (i.e., the $0^{th}$, $3^{rd}$, and $6^{th}$ physical pages) of the first spare physical block 410(R+1). Next, the memory management circuit 302 sequentially writes the data to be stored into the $3^{rd}$~$5^{th}$ logical pages of the logical block 610(0) into the lower physical pages (i.e., the $9^{th}$, $12^{th}$, and $15^{th}$ physical pages) of the first spare physical block 410(R+1). After writing the data of the $3^{rd}$~$5^{th}$ logical pages of the logical block 610(0) into the spare area 504, the memory management circuit 302 transmits a response message indicating the completion of the data writing operation to the host system 1000 and will not further copy other valid data. Since other valid data may become invalid data in the next operation (i.e., the next write command), the instant movement of other valid data into the spare area 504 may be meaningless.

After that, if the data of another logical block is to be stored into the spare area 504, and the number of blank physical blocks of the spare area 504 is insufficient (e.g., the number of blank physical blocks of the spare area 504 is less than the predetermined threshold value), the memory management circuit 302 sequentially copies the valid data from the $6^{th}$~$257^{th}$ physical pages of the physical block 410(T+1) to the lower physical pages of the spare physical blocks 410(R+1)~410(R+3) and performs the data merge operation.

In the present exemplary embodiment, when the data of one logical block is temporarily stored into the spare area 504 but is not yet moved to the data area 506, the logical block is called an updated logical block. Specifically, when the host system 1000 intends to read the data of the updated logical block, the memory management circuit 302 determines whether data of a logical page to be read by the host system 1000 is stored in the spare area 504. When data of the logical page to be read by the host system 1000 is stored in the spare area 504, the memory management circuit 302 reads the data from the corresponding spare physical block of the spare area 504 and transmits the read data to the host system 1000. By contrast, when data of the logical page to be read by the host system 1000 is not stored in the spare area 504, the memory management circuit 302 reads the data from the corresponding physical block of the data area 506 and transmits the read data to the host system 1000. Namely, the updated data is first stored into the spare area 504, and thus the data stored into the spare area 504 is definitely the most updated data. If the memory storage apparatus 100 is abnormally powered off, the memory management circuit 302 can still identify whether the stored data is the most updated data based on whether the physical block belongs to the spare area 504 or the data area 506.

Figures 9, 10:
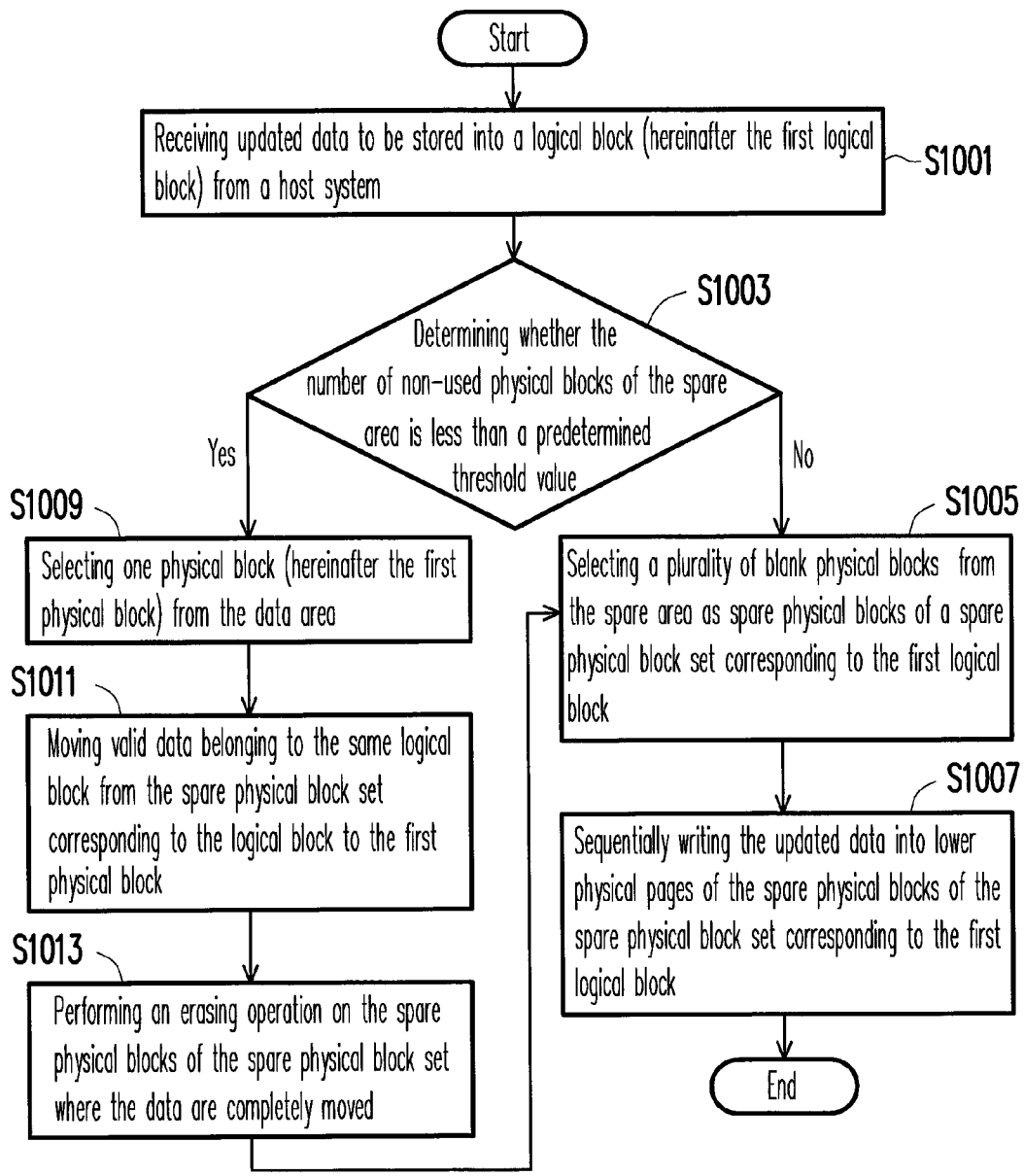
FIG. 9 is a flowchart of configuring a rewritable non-volatile memory module in the data writing method according to an exemplary embodiment of the present invention.
FIG. 10 is a flowchart of temporarily storing data into a spare area and performing a data merge operation in the data writing method according to an exemplary embodiment of the present invention.

FIG. 9 is a flowchart of configuring a rewritable non-volatile memory module in the data writing method according to an exemplary embodiment of the present invention.

With reference to FIG. 9, in step S901, the memory management circuit 302 at least partitions the physical blocks of the rewritable non-volatile memory module into a data area and a spare area. For instance, the physical blocks of the rewritable non-volatile memory module are partitioned into a replacement area 502, a spare area 504, and a data area 506. Specifically, the physical blocks of the spare area 504 and the physical blocks of the data area 506 are independently operated, wherein the physical blocks of the spare area 504 are accessed in the single-page mode, and the physical blocks of the data area 506 are accessed in the multi-page mode.

In step S903, the memory management circuit 302 configures, according to the physical blocks of the partitioned data area, a plurality of logical blocks for corresponding to the logical access addresses accessed by the host system 1000. To be more specific, the number of logical blocks is determined based on the number of physical blocks of the partitioned data area 506. For instance, in an exemplary embodiment, the number of logical blocks is equal to the number of physical blocks; in another exemplary embodiment, the number of logical blocks may be less than the number of physical blocks.

FIG. 10 is a flowchart of temporarily storing data into a spare area and performing a data merge operation in the data writing method according to an exemplary embodiment of the present invention.

With reference to FIG. 10, in step S1001, the memory management circuit 302 receives from the host system 1000 updated data to be stored into a logical block (hereinafter referred to as the first logical block).

In step S1003, the memory management circuit 302 determines whether the number of non-used physical blocks of the spare area 504 is less than a predetermined threshold value.

If the number of non-used physical blocks is more than or equal to the predetermined threshold value, in step S1005, the memory management circuit 302 selects a plurality of blank physical blocks from the spare area 504 as the spare physical blocks of the spare physical block set corresponding to the first logical block. For instance, in the present exemplary embodiment, the rewritable non-volatile memory module is a TLC NAND flash memory module, and the memory management circuit 302 selects three physical blocks from the spare area 504 as the first spare physical block, the second spare physical block, and the third spare physical block corresponding to the first logical block. It should be understood that the present invention is not limited thereto, and the memory management circuit 302 selects two physical blocks from the spare area 504 as the first spare physical block and the second spare physical block corresponding to the first logical block if the rewritable non-volatile memory module is an MLC NAND flash memory module.

In step S1007, the memory management circuit 302 sequentially writes the updated data into the lower physical pages of the spare physical blocks of the spare physical block set corresponding to the first logical block. The operations for writing the updated data into the lower physical pages of the spare physical blocks is described above with reference to FIGS. 6-8; therefore, no relevant descriptions are given hereinafter.

If the number of non-used physical blocks of the spare area 504 is less than the predetermined threshold value, in step S1009, the memory management circuit 302 selects one physical block (hereinafter referred to as the first physical block) from the data area 506. In step S1011, the memory management circuit 302 moves the valid data belonging to the same logical block from the spare physical block set corresponding to the logical block to the first physical block. Note that if the first physical block stores invalid data, the memory management circuit 302 performs the erasing operation on the first physical block before step S1011 is performed.

In step S1013, the memory management circuit 302 performs the erasing operation on the spare physical blocks of the spare physical block set where the data are completely moved.

That is to say, in steps S1009, S1011, and S1013, the memory management circuit 302 selects one of the updated logical blocks (e.g., the first logical block) to perform the data merge operation, so as to release the used spare physical block, and then step S1005 may be performed.

In light of the foregoing, as described in the exemplary embodiments of the present invention, the data to be written by the host system is temporarily stored in the spare area operated in the single-page mode. Therefore, the data writing method, the memory controller, and the memory storage apparatus described in the exemplary embodiments of the present invention are capable of effectively improving reliability and speed of writing data. Moreover, the data to be written is temporarily stored in the spare area, and the physical blocks of the data area are programmed in units of each physical page set (i.e., the lower, middle, and upper physical pages constituted by multiple memory cells arranged on the same word line). Hence, data storage reliability can be effectively enhanced. What is more, according to the data writing method, the memory controller, and the memory storage apparatus described in the exemplary embodiments of the present invention, if the host system continues to perform the data writing operation on the same logical block, the wear of the physical blocks of the data area can be effectively reduced because the data is updated in the spare area. The previously described exemplary embodiments of the present invention have the advantages aforementioned, wherein the advantages aforementioned not required in all versions of the invention.

Although the present invention has been described with reference to the above embodiments, it will be apparent to one of the ordinary skill in the art that modifications to the described embodiment may be made without departing from the spirit of the present invention. Accordingly, the scope of the present invention will be defined by the attached claims not by the above detailed descriptions.

What is claimed is:

1. A data writing method for a rewritable non-volatile memory module, wherein the rewritable non-volatile memory module has a plurality of physical blocks, each of the physical blocks has a plurality of physical page sets sequentially arranged, each of the physical page sets has a lower physical page and an upper physical page, a speed of writing data into the lower physical pages is faster than a speed of writing data into the upper physical pages, and the data writing method comprises:

partitioning the physical blocks into at least a data area and a spare area;

configuring a plurality of logical blocks according to the physical blocks belonging to the data area, wherein each of the logical blocks has a plurality of logical pages;

receiving a first write command, wherein the first write command instructs to write first updated data into a first logical block among the logical blocks, wherein a size of the first updated data is no less than a size of each of the physical blocks, and the updated data is a continuous data;

selecting a plurality of physical blocks from the physical blocks of the spare area as a plurality of spare physical blocks of a spare physical block set corresponding to the first logical block;

writing the first updated data only into the lower physical pages of the spare physical blocks of the spare physical block set in response to the first write command;

receiving a second write command, wherein the second write command instructs to write second updated data into the first logical block among the logical blocks;

writing the second updated data only into the lower physical pages of the spare physical blocks of the spare physical block set in response to the second write command, and at least one part of the first updated data become invalid data; and after the second updated data is written into the lower physical pages of the spare physical blocks of the spare physical block set, moving valid data of all the logical pages of the first logical block from the spare physical blocks of the spare physical block set to a first physical block among the physical blocks of the data area, wherein the valid data of all the logical pages of the first logical block are sequentially written into the lower physical page and the upper physical page of each of the physical page sets of the first physical block, and the lower physical page and the upper physical page of each of the physical page sets of the first physical block are programmed together.

2. The data writing method as recited in claim 1, wherein the physical blocks of the data area and the physical blocks of the spare area are operated independently.

3. The data writing method as recited in claim 1, wherein each of the physical page sets further has a middle physical page, and the speed of writing the data into the lower physical pages is faster than a speed of writing data into the middle physical pages, wherein the step of selecting the physical blocks from the physical blocks of the spare area as the spare physical blocks of the spare physical block set corresponding to the first logical block comprises:

selecting three physical blocks from the physical blocks of the spare area as a first spare physical block, a second spare physical block, and a third spare physical block of the spare physical block set corresponding to the first logical block.

4. The data writing method as recited in claim 3, wherein the step of writing the first updated data only into the lower physical pages of the spare physical blocks of the spare physical block set comprises:

writing a first portion of data of the first updated data into the lower physical pages of the first spare physical block;

after writing the first portion of data of the first updated data into the lower physical pages of the first spare physical block, writing a second portion of data of the updated data into the lower physical pages of the second spare physical block; and after writing the second portion of data of the first updated data into the lower physical pages of the second spare physical block, writing a third portion of data of the first updated data into the lower physical pages of the third spare physical block.

5. The data writing method as recited in claim 1 further comprising:

determining whether the number of non-selected physical blocks among the physical blocks of the spare area is less than a predetermined threshold value; and when the number of non-selected physical blocks among the physical blocks of the spare area is less than the predetermined threshold value, moving the valid data of all the logical pages of the first logical block from the spare physical block set to the first physical block.

6. The data writing method as recited in claim 1 further comprising:

performing an erasing operation on the first physical block before moving the valid data of all the logical pages of the first logical block from the spare physical block set to the first physical block.

7. The data writing method as recited in claim 1 further comprising:

mapping the first logical block to the first physical block and performing an erasing operation on the spare physical blocks of the spare physical block set after moving the valid data of all the logical pages of the first logical block from the spare physical block set to the first physical block.

8. A memory controller for controlling a rewritable non-volatile memory module, wherein the rewritable non-volatile memory module has a plurality of physical blocks, each of the physical blocks has a plurality of physical page sets sequentially arranged, each of the physical page sets has a lower physical page and an upper physical page, a speed of writing data into the lower physical pages is faster than a speed of writing data into the upper physical pages, and the memory controller comprises:

a host interface, configured to couple to a host system;

a memory interface, configured to couple to the rewritable non-volatile memory module; and a memory management circuit, coupled to the host interface and the memory interface and configured to partition the physical blocks into at least a data area and a spare area, wherein the memory management circuit is further configured to configure a plurality of logical blocks according to the physical blocks of the data area, and each of the logical blocks has a plurality of logical pages, wherein the memory management circuit is further configured to receive a first write command, wherein the first write command instructs to write first updated data into a first logical block among the logical blocks, wherein a size of the first updated data is no less than a size of each of the physical blocks, and the first updated data is a continuous data, wherein the memory management circuit is further configured to select a plurality of physical blocks from the physical blocks of the spare area as a plurality of spare physical blocks of a spare physical block set corresponding to the first logical block, wherein the memory management circuit is further configured to write the first updated data only into the lower physical pages of the spare physical blocks of the spare physical block set in response to the first write command, wherein the memory management circuit is further configured to receive a second write command, wherein the second write command instructs to write second updated data into the first logical block among the logical blocks, wherein the memory management circuit is further configured to write the second updated data only into the lower physical pages of the spare physical blocks of the spare physical block set in response to the second write command, and at least one part of the first updated data become invalid data, wherein, after the second updated data is written into the lower physical pages of the spare physical blocks of the spare physical block set, the memory management circuit is further configured to move valid data of all the logical pages of the first logical block from the spare physical blocks of the spare physical block set to a first physical block among the physical blocks of the data area, wherein the valid data of all the logical pages of the first logical block are sequentially written into the lower physical page and the upper physical page of each of the physical page sets of the first physical block, and the lower physical page and the upper physical page of each of the physical page sets of the first physical block are programmed together.

9. The memory controller as recited in claim 8, wherein the memory management circuit independently operates the physical blocks of the data area and the physical blocks of the spare area.

10. The memory controller as recited in claim 8, wherein each of the physical page sets further has a middle physical page, and the speed of writing the data into the lower physical pages is faster than a speed of writing data into the middle physical pages, wherein the memory management circuit selects three physical blocks from the physical blocks of the spare area as a first spare physical block, a second spare physical block, and a third spare physical block of the spare physical block set corresponding to the first logical block.

11. The memory controller as recited in claim 10, wherein the memory management circuit writes a first portion of data of the first updated data into the lower physical pages of the first spare physical block, wherein the memory management circuit writes a second portion of data of the first updated data into the lower physical pages of the second spare physical block after writing the first portion of data of the first updated data into the lower physical pages of the first spare physical block, wherein the memory management circuit writes a third portion of data of the first updated data into the lower physical pages of the third spare physical block after writing the second portion of data of the first updated data into the lower physical pages of the second spare physical block.

12. The memory controller as recited in claim 8, wherein the memory management circuit is further configured to determine whether the number of non-selected physical blocks among the physical blocks of the spare area is less than a predetermined threshold value, wherein when the number of non-selected physical blocks among the physical blocks of the spare area is less than the predetermined threshold value, the memory management circuit moves the valid data of all the logical pages of the first logical block from the spare physical block set to the first physical block.

13. The memory controller as recited in claim 8, wherein the memory management circuit is further configured to perform an erasing operation on the first physical block before moving the valid data of all the logical pages of the first logical block from the spare physical block set to the first physical block.

14. The memory controller as recited in claim 8, wherein the memory management circuit is further configured to map the first logical block to the first physical block and perform an erasing operation on the spare physical blocks of the spare physical block set after moving the valid data of all the logical pages of the first logical block from the spare physical block set to the first physical block.

15. A memory storage apparatus comprising:
a connector, configured to couple to a host system;
a rewritable non-volatile memory module having a plurality of physical blocks, wherein each of the physical blocks has a plurality of physical page sets sequentially arranged, each of the physical page sets has a lower physical page and an upper physical page, and a speed of writing data into the lower physical pages is faster than a speed of writing data into the upper physical pages; and
a memory controller, coupled to the connector and the rewritable non-volatile memory module and configured to partition the physical blocks into at least a data area and a spare area,
wherein the memory controller is further configured to set a plurality of logical blocks according to the physical blocks of the data area, and each of the logical blocks has a plurality of logical pages,
wherein the memory controller is further configured to receive a first write command, wherein the first write command instructs to write first updated data into a first logical block among the logical blocks, wherein a size of the first updated data is no less than a size of each of the physical blocks, and the first updated data is a continuous data;

wherein the memory controller is further configured to select from the physical blocks of the spare area a plurality of physical blocks as a plurality of spare physical blocks of a spare physical block set corresponding to the first logical block, wherein the memory controller is further configured to write the first updated data only into the lower physical pages of the spare physical blocks of the spare physical block set in response to the first write command, wherein the memory controller is further configured to receive a second write command, wherein the second write command instructs to write second updated data into the first logical block among the logical blocks, wherein the memory controller is further configured to write the second updated data only into the lower physical pages of the spare physical blocks of the spare physical block set in response to the second write command, and at least one part of the first updated data become invalid data, wherein, after the second updated data is written into the lower physical pages of the spare physical blocks of the spare physical block set, the memory controller is further configured to move valid data of all the logical pages of the first logical block from the spare physical blocks of the spare physical block set to a first physical block among the physical blocks of the data area, wherein the valid data of all the logical pages of the first logical block are sequentially written into the lower physical page and the upper physical page of each of the physical page sets of the first physical block, and the lower physical page and the upper physical page of each of the physical page sets of the first physical block are programmed together.

16. The memory storage apparatus as recited in claim 15, wherein the memory controller independently operates the physical blocks of the data area and the physical blocks of the spare area.

17. The memory storage apparatus as recited in claim 15, wherein the physical pages of each of the physical page sets further include a middle physical page, and the speed of writing the data into the lower physical pages is faster than a speed of writing data into the middle physical pages, wherein the memory controller selects three physical blocks from the physical blocks of the spare area as a first spare physical block, a second spare physical block, and a third spare physical block of the spare physical block set corresponding to the first logical block.

18. The memory storage apparatus as recited in claim 17, wherein the memory controller writes a first portion of data of the first updated data into the lower physical pages of the first spare physical block, wherein the memory controller writes a second portion of data of the first updated data into the lower physical pages of the second spare physical block after writing the first portion of data of the first updated data into the lower physical pages of the first spare physical block, wherein the memory controller writes a third portion of data of the first updated data into the lower physical pages of the third spare physical block after writing the second portion of data of the first updated data into the lower physical pages of the second spare physical block.

19. The memory storage apparatus as recited in claim 15, wherein the memory controller is further configured to determine whether the number of non-selected physical blocks among the physical blocks of the spare area is less than a predetermined threshold value, wherein when the number of non-selected physical blocks among the physical blocks of the spare area is less than the predetermined threshold value, the memory controller moves the valid data of all the logical pages of the first logical block from the spare physical block set to the first physical block.

20. The memory storage apparatus as recited in claim 15, wherein the memory controller is further configured to perform an erasing operation on the first physical block before moving the valid data of all the logical pages of the first logical block from the spare physical block set to the first physical block.

21. The memory storage apparatus as recited in claim 15, wherein the memory controller is further configured to map the first logical block to the first physical block and perform an erasing operation on the spare physical blocks of the spare physical block set after moving the valid data of all the logical pages of the first logical block from the spare physical block set to the first physical block.

* * * * *